Patented Nov. 26, 1929

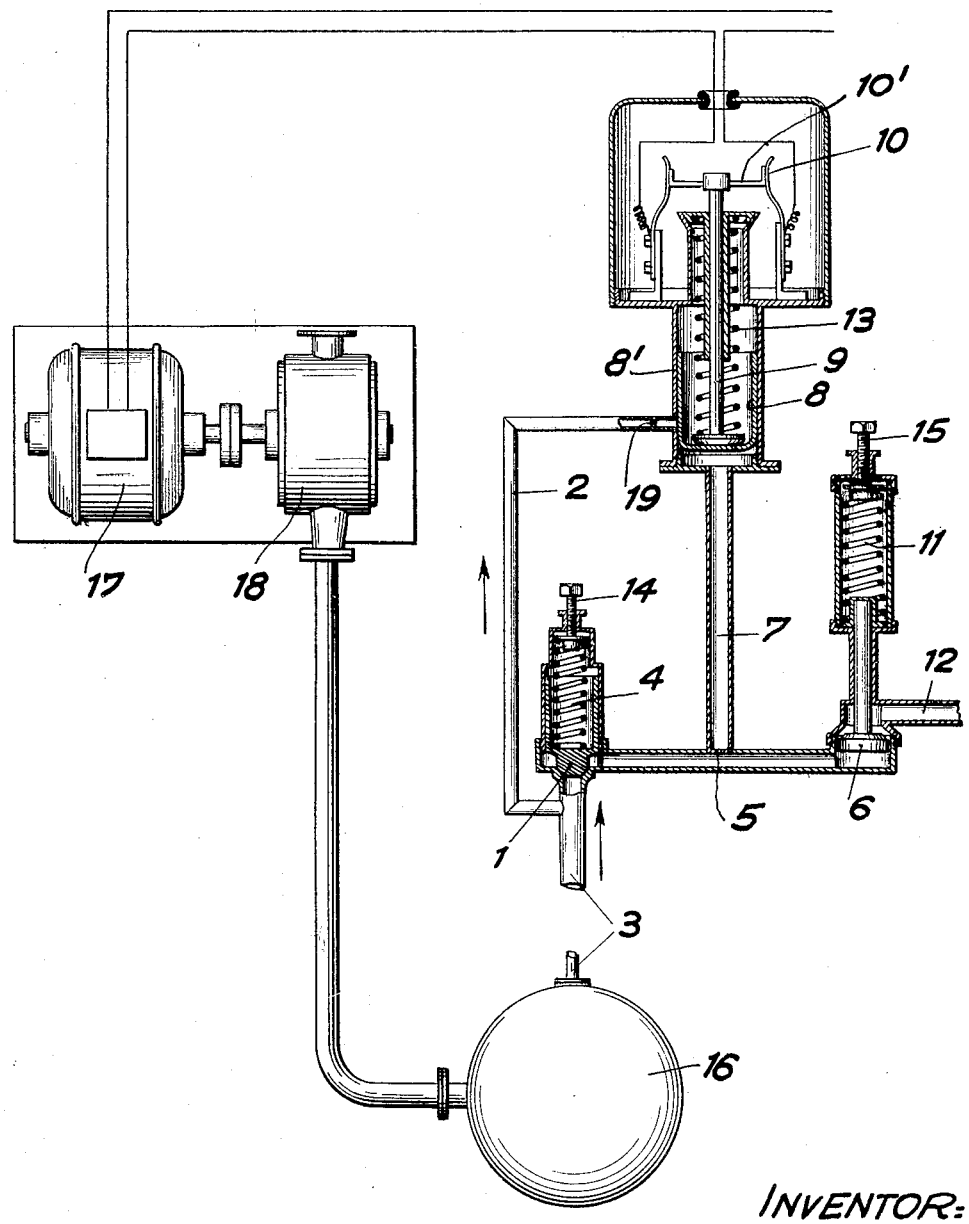

1,737,335

UNITED STATES PATENT OFFICE

ALWIN RUCKSTUHL, OF WINTERTHUR, SWITZERLAND

CONTROL FOR ELECTRICALLY-DRIVEN COMPRESSORS

Application filed February 14, 1929, Serial No. 339,974, and in Germany February 18, 1928.

The present invention has to solve the task of cutting out an electric motor driving a compressor when the pressure in a receptacle to be filled by the compressor has reached a determined maximum value and of cutting it in again when the pressure in the receptacle has dropped to a determined minimum value.

Controlling arrangements of this type comprise a fluid operated piston actuating an electric switch, an inlet valve and an outlet valve which control the admission or outlet of the compressed fluid to or from said piston. Heretofore a relay has been used in which the compressed fluid, for instance compressed air, has been led to or from the piston actuating the electric switch by inlet and outlet valves respectively operated by membranes.

Furthermore devices controlling the pressure are known in which inlet and outlet valves are mechanically coupled.

According to the present invention the inlet and the outlet valve are connected with each other by a fluid conduit without any mechanical connection and the piston actuating the switch is connected to the same conduit so that when the maximum pressure is reached the stream of compressed fluid which lifts the inlet valve closes the outlet valve.

In order to maintain the fluid pressure below the piston of the switch when the valves are closed compressed fluid is supplied by a pressure equalizing conduit controlled by the piston.

A constructional example of the subject matter of the present invention is diagrammatically illustrated on the accompanying drawing.

In the drawing 1 denotes the inlet valve. 6 is the outlet valve and 8 the piston for actuating an electric switch. Inlet valve and outlet valve are connected with each other by a fluid conduit to which the conduit 7 leading to the switch piston 8 is connected intermediate of the valves: From a conduit 3 connecting to the storage receptacle 16 a pressure equalizing conduit 2 branches off and leads to the cylinder 8' of the piston 8. 17 denotes the electric motor driving a compressor 18, which delivers by the conduit 19 compressed fluid, for instance compressed air, to the receptacle 16. The electric motor 17 is connected to the mains over the switch, which is diagrammatically indicated by the contact springs 10, with which a contact piece 10' cooperates, the latter being connected to and insulated against the rod 9 of the piston 8.

In order to cut out the electric motor 17 the arrangement operates as follows:

The space below the inlet valve 1 and the pressure equalizing conduit 2 are always connected up to the receptacle 16 by the conduit 3. As soon as the determined maximum pressure is reached the inlet valve 1, which is loaded by the spring 4 is opened. The stream of compressed air admitted by the opened inlet valve 1 closes first the outlet valve 6, against the action of the spring 11 and thereafter owing to the retarding action of the restricted passage 5 the compressed air flows through the conduit 7 into the space below the piston 8 forces the latter against the action of the spring 13 in the upward direction, whereby the contact piece 10' leaves the contact springs 10 and interrupts the circuit, so that the motor 17 is cut out and the compressor stopped.

When the pressure in the receptacle drops by a fraction of one atmosphere the inlet valve 1 closes. This function does not cause a closing of the switch as the space below the piston 8 and below the outlet valve 6 is still connected with the conduit 3 by means of the pressure equalizing conduit 2.

Only after the pressure has dropped to the determined minimum the spring 11 causes the opening of the outlet valve 6 and the air below the piston 8 escapes through the conduit 12 into the open. The spring 13 forces the piston 8 and the piston rod 9 quickly in the downward direction, the switch is caused to follow this movement and closes the circuit of the motor; at the same time the piston 8 closes the outlet of the conduit 2. A restricted passage 19 is provided in the conduit 2 for the purpose of keeping small the quantity of compressed fluid to escape through the outlet valve 6 and of reducing thereby the stroke and the free cross-sectional area of the outlet valve. The compressor 18 is thus again started. The screws 14 and 15 serve for adjusting the tension of the springs 4 and 11 and thereby to determine the maximum and minimum pressure at which the device is to become operative.

I claim:

1. A pressure responsive device for controlling electrically driven compressors, comprising in combination, switch means for cutting in and out the electric current, a cylinder and a fluid operated piston therein for actuating said switch means and starting and stopping the compressor when the fluid pressure has reached a determined minimum or maximum value respectively, an inlet valve for the pressure fluid, an outlet valve for the pressure fluid, and a conduit to which said inlet valve and said outlet valve and said cylinder are connected, wherein the outlet valve is closed by the pressure fluid admitted by the opening of the inlet valve.

2. A pressure responsive device for controlling electrically driven compressors, comprising in combination, switch means for cutting in and out the electric current, a cylinder and a fluid operated piston therein for actuating said switch means and starting and stopping the compressor when the fluid pressure has reached a determined minimum or maximum value respectively, an inlet valve for the pressure fluid, an outlet valve for the pressure fluid, a conduit to which said inlet valve and said outlet valve and said cylinder are connected, said cylinder having a restricted passage connecting it to said conduit, wherein the outlet valve is closed by the pressure fluid admitted by the opening of the inlet valve and the piston is actuated thereafter.

3. A pressure responsive device for controlling electrically driven compressors, comprising in combination, switch means for cutting in and out the electric current, a cylinder and a fluid operated piston therein for actuating said switch means and starting and stopping the compressor when the fluid pressure has reached a determined minimum or maximum value respectively, an inlet valve for the pressure fluid, an outlet valve for the pressure fluid, a conduit to which said inlet valve and said outlet valve and said cylinder are connected, and a pressure equalizing conduit leading from a point in front of the inlet valve to the cylinder of the switch actuating piston, the outlet of said conduit being controlled by said piston.

4. A pressure responsive device for controlling electrically driven compressors, comprising in combination, switch means for cutting in and out the electric current, a cylinder and a fluid operated piston therein for actuating said switch means and starting and stopping the compressor when the fluid pressure has reached a determined minimum or maximum value respectively, an inlet valve for the pressure fluid, an outlet valve for the pressure fluid, a conduit to which said inlet valve and said outlet valve and said cylinder are connected, a pressure equalizing conduit leading from a point in front of the inlet valve to the cylinder of the switch actuating piston, the outlet of said conduit being controlled by said piston, and a restricted passage in said equalizing conduit for restricting the quantity of compressed fluid flowing through said equalizing conduit and the stroke and of said outlet valve.

5. A pressure responsive device for controlling electrically driven compressors, comprising in combination, switch means for cutting in and out the electric current and starting and stopping the compressor when the fluid pressure has reached a determined minimum or maximum value respectively, a cylinder and a fluid operated spring loaded piston therein for actuating said switch means, and means to control the flow of fluid to and from said cylinder which means comprises an inlet valve for admitting pressure when the pressure has reached the determined maximum value, an outlet valve for providing an escape of pressure fluid, when the pressure has reached a determined minimum value, a conduit for pressure fluid in which the two valves are inserted, and a connection to said cylinder branching off said conduit intermediate of said two valves.

6. A pressure responsive device for controlling electrically driven compressors, comprising in combination, switch means for cutting in and out the electric current and starting and stopping the compressor when the fluid pressure has reached a determined minimum or maximum value respectively, a cylinder and a fluid operated spring loaded piston therein for actuating said switch means, and means to control the flow of fluid to and from said cylinder which means comprise an inlet valve for admitting pressure when the pressure has reached the determined maximum value, adjustable spring means for loading said valve and determining said maximum pressure, an outlet valve for providing an escape of pressure fluid when the pressure has reached a determined minimum value, a conduit for pressure fluid in which two valves are inserted, and a connection to said cylinder branching off said conduit intermediate of said two valves.

In testimony whereof I have signed my